Patented July 18, 1939

2,166,236

UNITED STATES PATENT OFFICE 2,166,236

COMPOSITION OF MATTER

Richard A. Crawford, Akron, Ohio, assignor to The B. F. Goodrich Company, New York, N. Y., a corporation of New York No Drawing. Application March 6, 1937, Serial No. 129,520

2 Claims. (Cl. 106—23)

This invention relates to a new composition of matter, and has among its objects to provide a coating material which will be an efficient sound-deadener on automobile bodies; to provide a coating material which will adhere firmly to a surface without chipping or cracking even after the prolonged shocks to which automobile bodies are necessarily subjected; and to provide a material which may be baked onto the inside of automobile bodies simultaneously with the baking operation used for automobile finishes.

For the quiet operation of automobiles, trains, and other vehicles, it is desirable to have some kind of sound-deadening material attached to the metallic bodies. While this has long been realized, compositions which were effective were too expensive to be widely used commercially. Asphalt compositions have a tendency to harden with cold, and to be so brittle that they crack and chip off from the surfaces to which they are attached. Sponge rubber is an excellent material, but is precluded because of its expense.

I have discovered that if certain water dispersions containing rubber, pitch, a dispersing agent, and a filler are applied to metal or other surfaces by troweling, spraying, brushing, dipping, or extrusion, blowing or sponging occurs when the composite structure is subjected to a forced drying or baking operation such as is used for baking the finish on automobiles. During the heating operation, the dispersion is coagulated and dried, thereby forming a spongy, sound-deadening layer adhered to the metal. The ingredients in the dispersion are combined in such proportions that a soft composition which will permit the formation of a permanent spongy structure at the temperature of baking is produced.

The pitch is the principal component of my composition. Besides having excellent sound-deadening properties, it is cheap and serves as a cohesive for the composition. I prefer to use about 50% of pitch, though I may use as little as 30% and as much as 70% or over. A wide variety of pitches may be used, such as mineral rubber, pine tar pitch, asphalt, Burgundy pitch, coal-tar pitch, etc. The composition should be solid enough at the temperatures at which the sound-deadening compositions is to be used, which is usually below 120° F. for automobile bodies, to retain the cellular structure. It must be soft enough at the temperature of baking, which is about 180°–240° F. so that it will blow to form the cellular structure, but it must not be so soft that the composition collapses. Thus, the particular pitch which I select depends upon the characteristics which the composition must have at certain temperatures. I find that compositions containing Trinidad asphalt are suitable for use in automobile bodies.

I prefer to use from 10% to 40% of rubber in my new composition. Its presence modifies the thermoplastic characteristics of the pitch in such a manner that the composition is flexible over a wider temperature range than is possible with pitch alone. Such compositions are dough-like rather than fluid at baking temperatures, thus facilitating the formation of the cellular structure produced by evaporation of water or by blowing agents at baking temperatures. The term "rubber" is meant to include reclaimed rubber, since it serves the same purpose and is much cheaper than crude rubber. One of the most satisfactory sources of rubber is tire reclaim made by the heater process.

Softeners such as pine tar, paraffin and rosin may be added to further modify the characteristics of the composition. Rosin is especially useful to modify the hardness of the dried material and to increase its adhesion to metal. I prefer to use 5% to 10% of rosin to produce these desirable results. However, softeners are not essential to the usefulness of my compositions.

From 20% to 40% of a filler is used in the composition to strengthen it and to give it body. Though inorganic fillers such as clay, zinc oxide, chalk, diatomaceous earth, slate flour, and powdered mica may be used, animal, vegetable and mineral fibers such as wool, cotton flock, wood flour, asbestos, and spun glass are preferable because they are light and bulky.

All of the compositions of this invention are "blowing dispersions", by which term I mean a dispersion which, when baked at the proper temperature, will become spongy and will retain its expanded condition after the baking is finished.

I may use any one of the well-known dispersing agents such as colloidal clay, soaps, casein, glue, etc. In making the dispersion, I usually combine the asphalt, rubber, and any softener I may use in suitable mixing equipment. I transfer the mixture to an internal mixer of the Werner-Pfleiderer or Banbury type, slowly add the dispersing agent and the water, and mix until the compound is dispersed. I add the filler, and then dilute the dispersion to the desired consistency with water. I do not intend to limit myself to this method of preparing the dispersion, however, for dispersions prepared by other methods are equally useful for the purposes of my invention.

I usually bake the compositions at a temperature high enough so that the water functions as the only blowing agent. It is within the scope of my invention, however, to emulsify a lower boiling compound such as benzene, naphtha, petroleum ether, gasoline, or the commercial heptane fraction known as Skellysolve C in my dispersions to assist in the blowing. I may also use heat-unstable salts such as ammonium bicarbonate as an additional blowing agent, but these are effective only when the dispersion is baked at temperatures higher than those I usually employ. The term "blowing agent" in the appended claims is used to mean a substance other than water which is added to the dispersion to assist in the blowing process.

As specific embodiments of my invention, I will disclose two compositions which I use as a sound-deadener on automobile bodies.

*Example 1*

|  | Parts by weight |
|---|---|
| Reclaimed rubber | 33.3 |
| Trinidad asphalt | 33.3 |
| Wilkinite clay | 16.7 |
| Suprex clay | 16.7 |
| Water | 100 |

The above dispersion is prepared by the method previously outlined. The Wilkinite clay is a fine clay used as a dispersing agent, while the Suprex clay is a coarser clay used as a filler.

*Example 2*

|  | Parts by weight |
|---|---|
| Reclaimed rubber | 10 |
| Trinidad asphalt | 55 |
| Rosin | 10 |
| Potassium oleate | 5 |
| Wood flour | 20 |
| Water | 100 |

This dispersion is prepared by the method previously outlined. The above dispersions may be applied to metal and baked for an hour at about 220° F. In both cases, the metal is covered with an adherent, spongy layer which is a very efficient sound-deadener.

Though these blowing dispersions are primarily useful as sound-deadeners, they may also be used as sponge gaskets, sealing members, flooring, etc. While I have herein disclosed specific compositions, I do not limit myself wholly thereto, for it is evident that many modifications including substituting equivalent materials and varying the proportions of materials used are within the spirit and scope of the invention as defined in the appended claims.

I claim:
1. A spongy, sound-deadening material comprising substantially 10% to 40% of rubber, 20% to 40% of a filler, 5% to 10% of a softener, 30% to 70% of pitch, and a dispersing agent.
2. A spongy, sound-deadening material comprising substantially 10% to 40% of rubber, 20% to 40% of wood flour, 30% to 70% of asphalt, 5% to 10% of rosin, and 5% to 20% of colloidal clay.

RICHARD A. CRAWFORD.